(12) United States Patent
Ling et al.

(10) Patent No.: US 8,021,022 B2
(45) Date of Patent: Sep. 20, 2011

(54) LIGHTING STRUCTURE

(75) Inventors: Kuo-Nan Ling, Taipei (TW); Wen-Wei Yang, Taipei (TW); Chih-Lung Hung, Taipei (TW); Wen-Chuan Su, Taipei (TW)

(73) Assignee: Compal Electronics, Inc., Taipei (TW)

( * ) Notice: Subject to any disclaimer, the term of this patent is extended or adjusted under 35 U.S.C. 154(b) by 526 days.

(21) Appl. No.: 12/170,444

(22) Filed: Jul. 10, 2008

(65) Prior Publication Data

US 2010/0008096 A1   Jan. 14, 2010

(51) Int. Cl.
*F21V 2/26* (2006.01)

(52) U.S. Cl. ........ 362/274; 362/285; 362/287; 362/288; 362/364; 362/365; 362/372; 362/418; 362/427

(58) Field of Classification Search .................. 362/274, 362/287, 418, 427, 364, 365, 372, 428, 285, 362/288, 253
See application file for complete search history.

(56) References Cited

U.S. PATENT DOCUMENTS

| | | | |
|---|---|---|---|
| 6,834,975 B2 * | 12/2004 | Chu-Chia et al. | 362/84 |
| 6,884,949 B2 * | 4/2005 | Yoon | 200/50.26 |
| 7,794,113 B2 * | 9/2010 | Lee | 362/274 |
| 2007/0236908 A1 * | 10/2007 | Yukawa et al. | 362/23 |
| 2007/0253182 A1 * | 11/2007 | Motai et al. | 362/23 |
| 2008/0266865 A1 * | 10/2008 | Lev et al. | 362/287 |

FOREIGN PATENT DOCUMENTS

TW          M314822          7/2007

* cited by examiner

*Primary Examiner* — Diane Lee
*Assistant Examiner* — Mary Zettl
(74) *Attorney, Agent, or Firm* — Jianq Chyun IP Office

(57) ABSTRACT

A lighting structure adapted to be disposed at an electronic apparatus is provided. The lighting structure includes a lighting module, a first elastic element, a latch, and a second elastic element. The lighting module has a light source and a stopper element. The first elastic element is connected to the lighting module. The latch has an interfering portion for blocking the stopper element and is capable of sliding in the electronic apparatus. The second elastic element is connected to the latch. When the latch is subjected to an external force and slides to deform the second elastic element, the stopper element disengages from the interfering portion, and the first elastic element rotates the lighting module, such that the lighting module is at a different position, and the light source is used to illuminate part of the electronic apparatus.

20 Claims, 12 Drawing Sheets

LIGHTING STRUCTURE

BACKGROUND OF THE INVENTION

1. Field of the Invention

The present invention generally relates to a lighting structure and, in particular, to an adjustable lighting structure.

2. Description of Related Art

With the progress of the electronic technology, electronic apparatuses are miniaturized gradually, such that a lot of electronic apparatuses have become portable. A portable electronic apparatus, such as a notebook computer, may be carried to various occasions. In some occasions, the environment is not bright enough for a user to see the keys on a notebook computer such that the user cannot use the notebook computer normally. Therefore, a lighting structure disposed at the notebook computer is needed to light the keys in these occasions.

FIGS. 1A through 1C are schematic cross-sectional views of a conventional lighting structure on a notebook computer in three different states, respectively. Referring to FIGS. 1A through 1C, the conventional lighting structure 100 disposed at a notebook computer 50 includes a sliding block 110, a rotation structure 120, a conductor 130, a torsion coil spring 140, a compression coil spring 150, and a light-emitting diode (LED) 160. In the state shown in FIG. 1A, the lighting structure 100 is at a closed state, the conductor 130 does not contact a conductor 62 on a housing 60 of the notebook computer 50 such that the LED 160 does not emit light, and an interfering portion 112 of the sliding block 110 interferes with a interfering portion 64 of the housing 60.

In the state shown in FIG. 1B, the sliding block 110 is pushed by a user, such that the interfering portion 112 of the sliding block 110 does not interfere with the interfering portion 64 of the housing 60, and the torsion coil spring 140 exerts a torque on the rotation structure 120 such that the rotation structure 120 rotates to the open state shown in FIG. 1C. In the open state shown in FIG. 1C, the conductor 130 contacts the conductor 62 so as to turn on the LED 160.

However, in the lighting structure 100, the LED 160 is turned on only when the conductor 130 contacts the conductor 62, so that the lighting structure 100 has only one rotation position to provide illumination, which limits the application of the lighting structure 100 since it only gives one lighting angle.

SUMMARY OF THE INVENTION

Accordingly, the present invention is directed to a lighting structure, a lighting module of which is adapted to emit light at different positions and at different intensities.

According to an embodiment of the present invention, a lighting structure adapted to be disposed at an electronic apparatus is provided. The lighting structure includes a lighting module, a first elastic element, a latch, and a second elastic element. The lighting module has a light source and a stopper element. The first elastic element is connected to the lighting module. The latch has an interfering portion for blocking the stopper element and is capable of sliding in the electronic apparatus. The second elastic element is connected to the latch. When the latch is subjected to an external force and slides to deform the second elastic element, the stopper element disengages from the interfering portion, and the first elastic element rotates the lighting module, such that the lighting module is at a different position, and the light source is used to illuminate part of the electronic device.

In the lighting structure according to the embodiments of the present invention, since the stopper element is disposed on the lighting module, and since the lighting module and the latch are individual elements, the lighting module has a small volume and less weight. Therefore, the lighting structure according to the embodiments of the present invention is easier to operate and has better appearance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
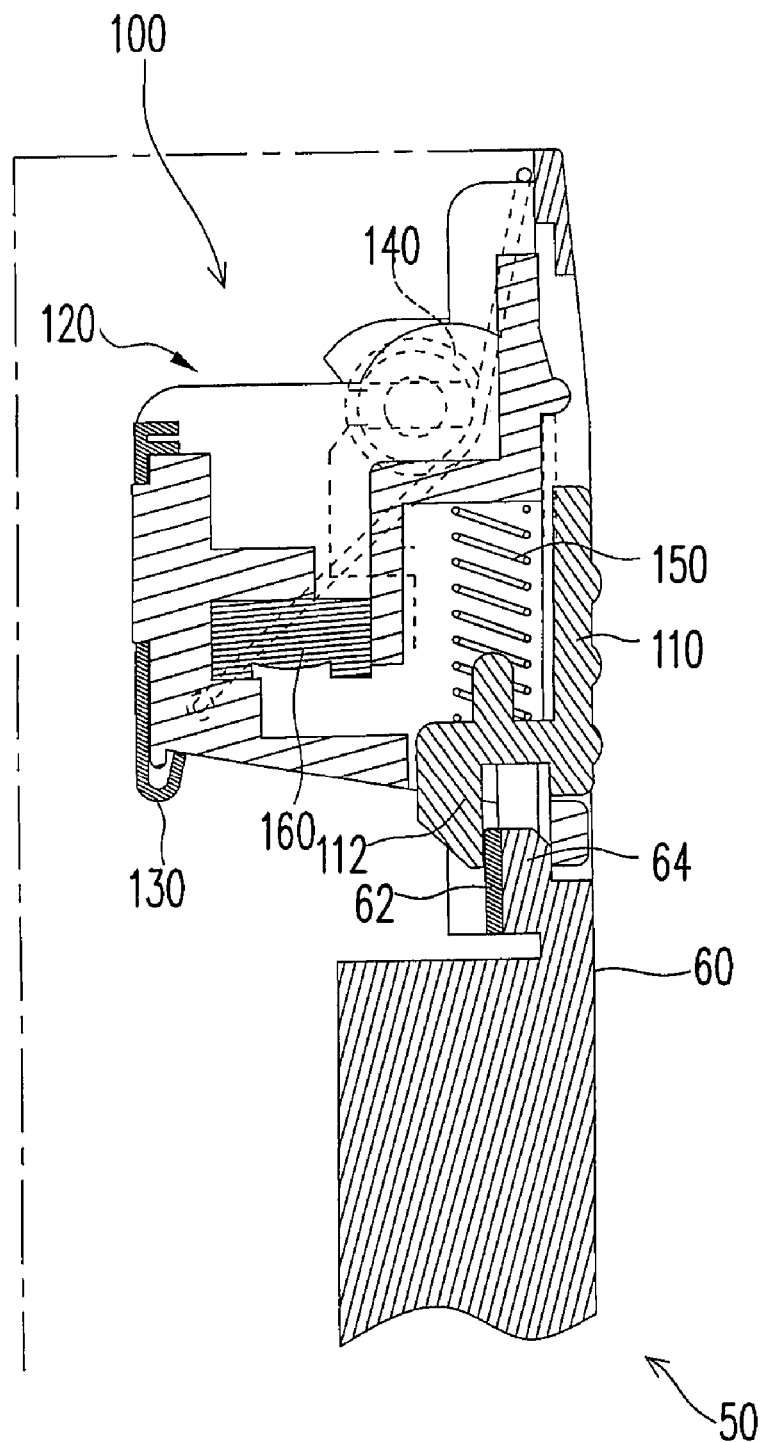
FIGS. 1A through 1C are schematic cross-sectional views of a conventional lighting structure on a notebook computer in three different states, respectively.
Figure 1B:
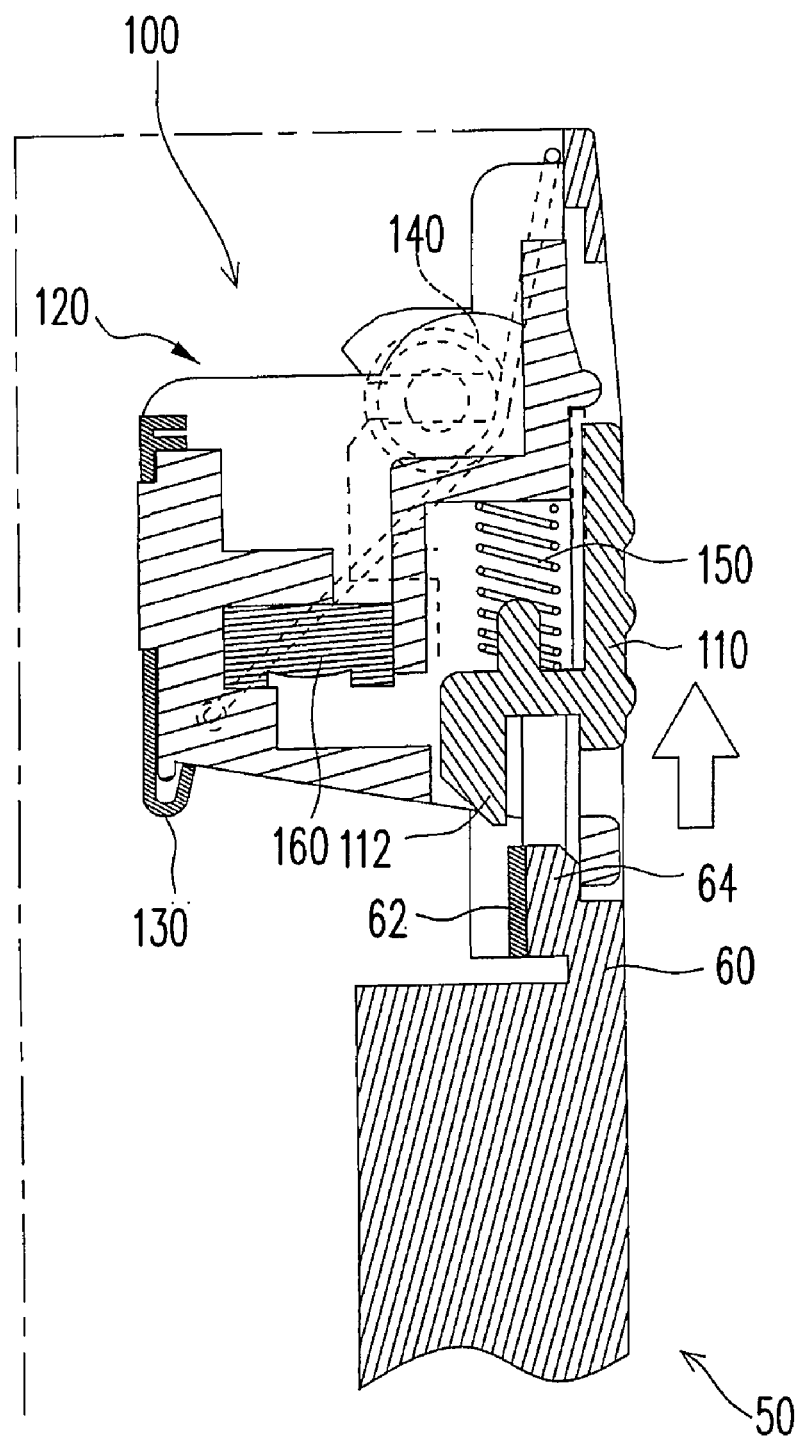
Figure 1C:
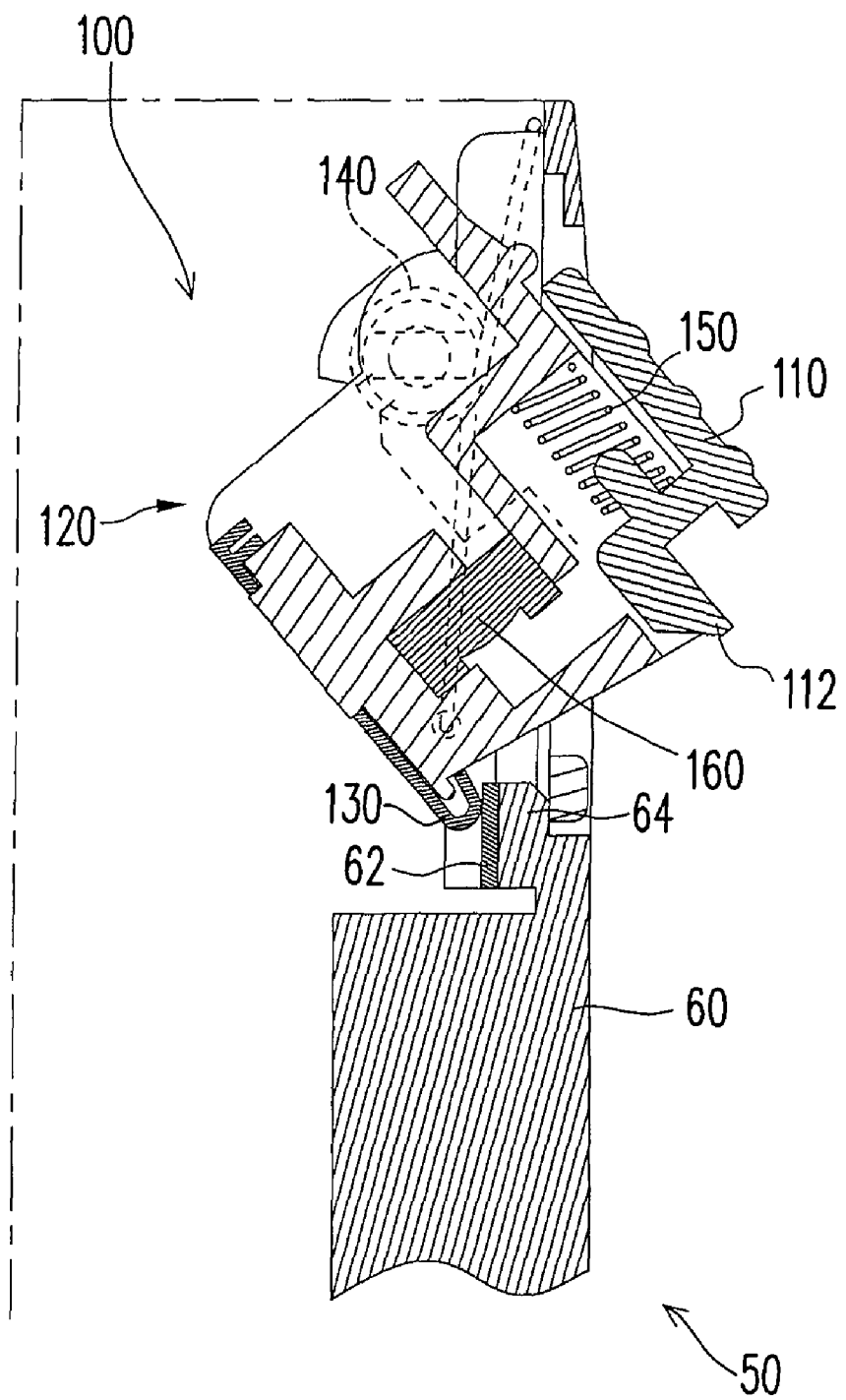

Reference will now be made in detail to the present embodiments of the invention, examples of which are illustrated in the accompanying drawings. Wherever possible, the same reference numbers are used in the drawings and the description to refer to the same or like parts.

Figure 2A:
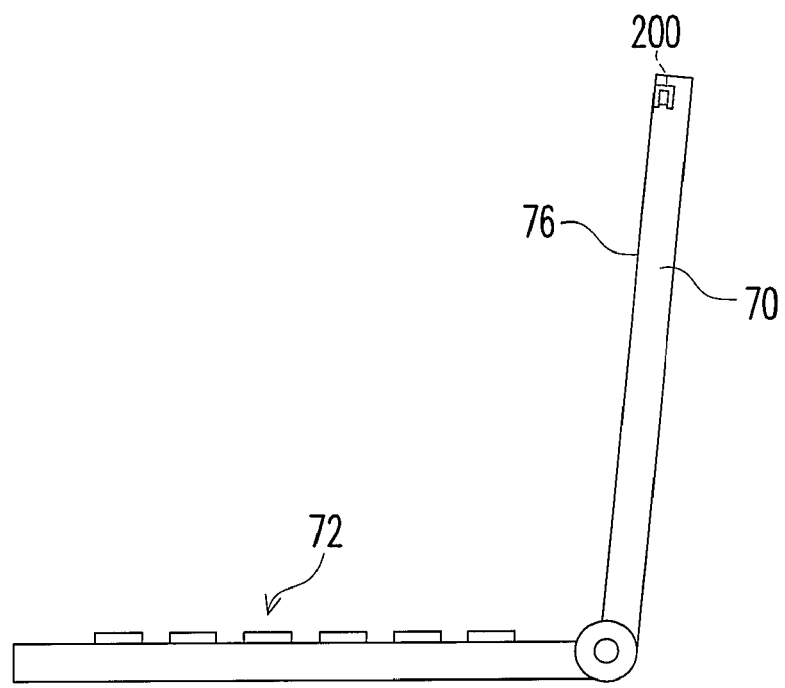
FIG. 2A is a schematic structural view of a lighting structure disposed at an electronic apparatus at a first state according to an embodiment of the present invention.
Figure 2B:
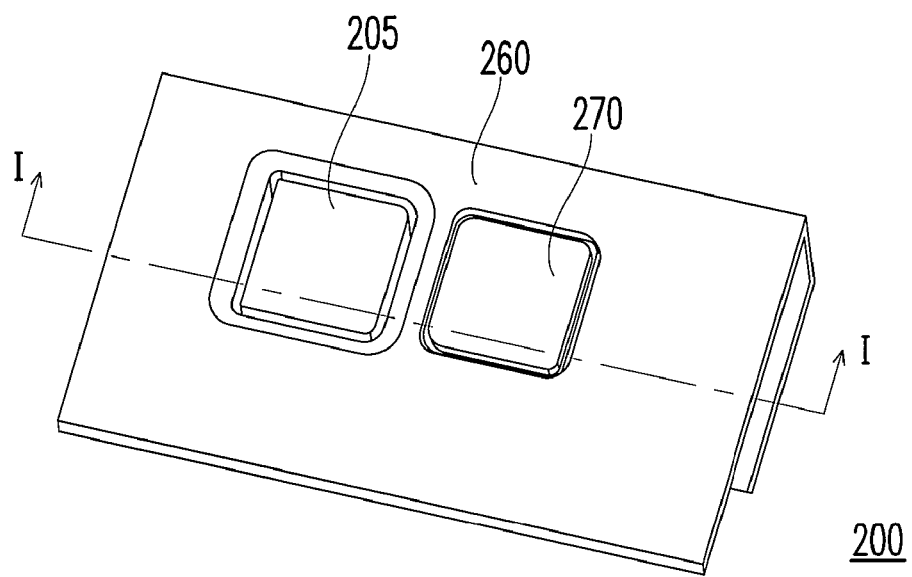
FIGS. 2B and 2C are schematic perspective views of the lighting structure in FIG. 2A at two different viewing angles.
Figure 2C:
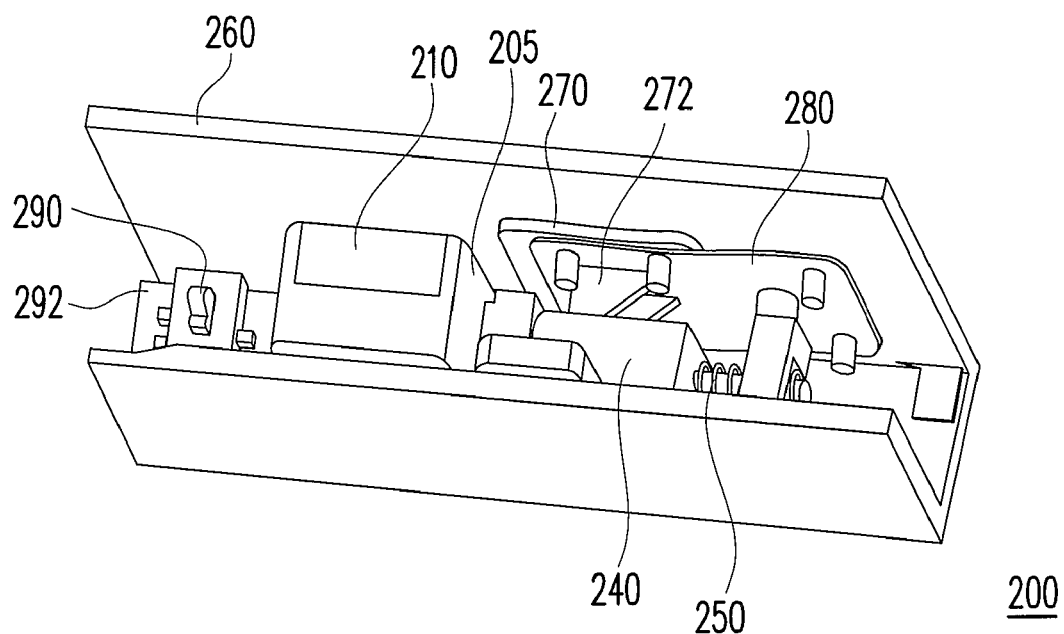
Figure 2D:
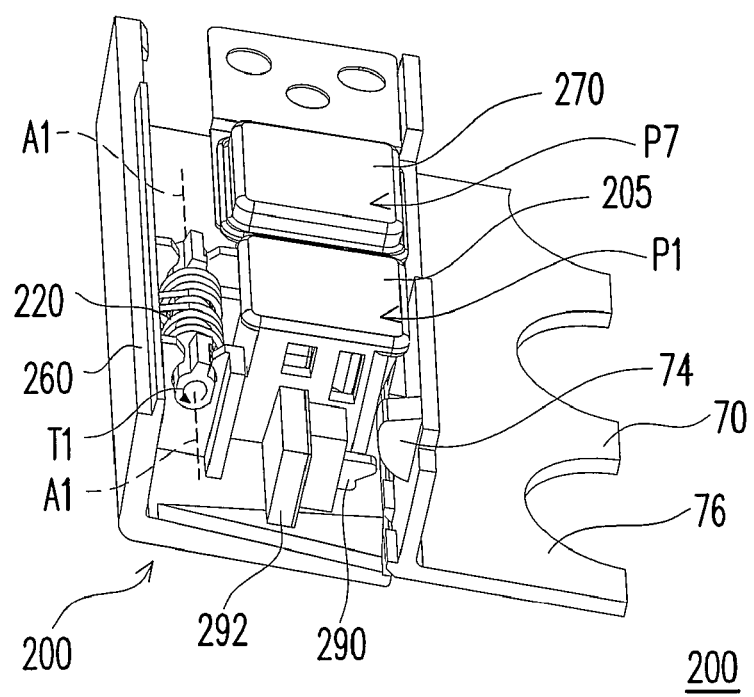
FIG. 2D is a schematic perspective view of the lighting structure in FIG. 2A in which a part of a case is removed.
Figure 2E:
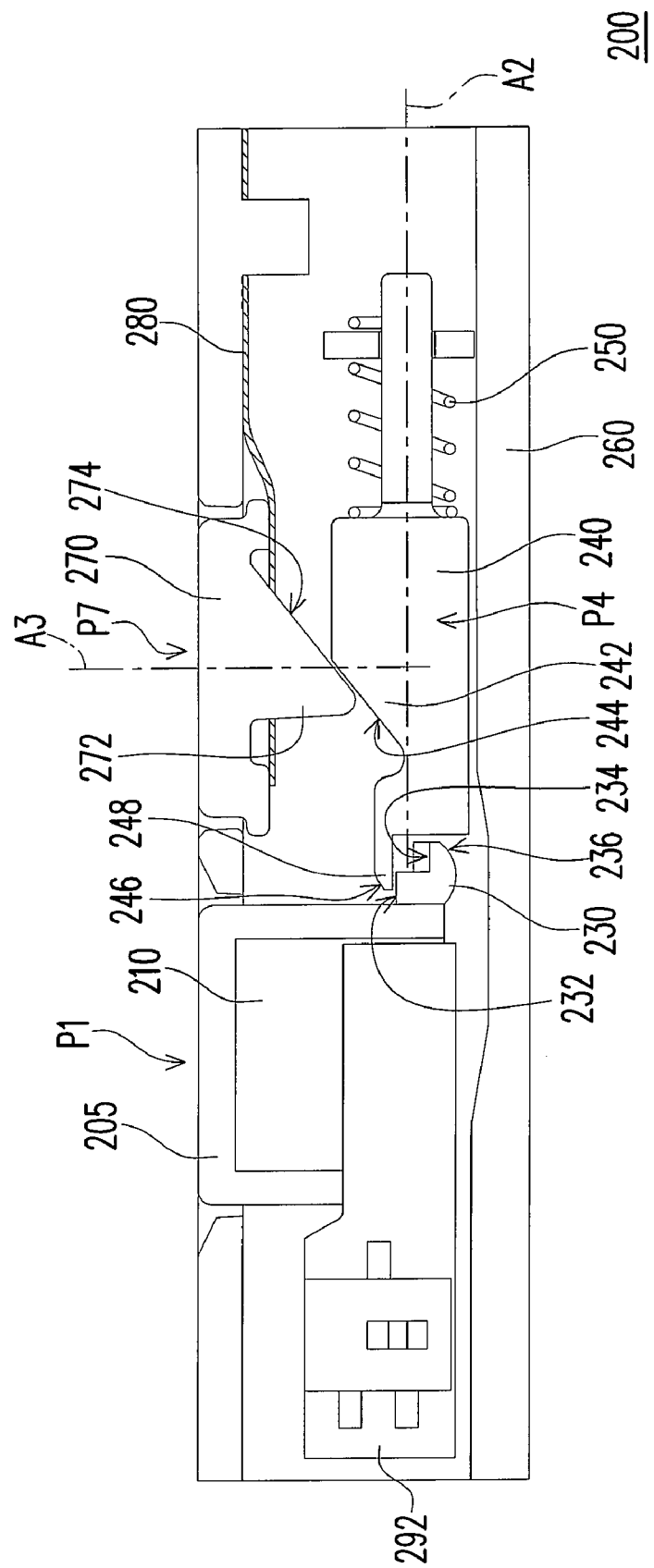
FIG. 2E is a schematic cross-sectional view of the lighting structure in FIG. 2A taken along line I-I.

FIG. 2A is a schematic structural view of a lighting structure disposed at an electronic apparatus at a first state according to an embodiment of the present invention, FIGS. 2B and 2C are schematic perspective views of the lighting structure in FIG. 2A at two different viewing angles, FIG. 2D is a schematic perspective view of the lighting structure in FIG. 2A in which a part of a case is removed, and FIG. 2E is a schematic cross-sectional view of the lighting structure in FIG. 2B taken along line I-I. Referring to FIGS. 2A through 2E, the lighting structure 200 of the present embodiment is adapted to be disposed at an electronic apparatus 70. The electronic apparatus 70 is a notebook computer in the present embodiment but may be a personal digital assistant (PDA), a digital camera, a display apparatus, or other appropriate electronic apparatuses in other embodiments. The lighting structure 200 includes a lighting module 205, a first elastic element 220 as shown in FIG. 2D, a latch 240 as shown in FIGS. 2C and 2E, and a second elastic element 250. In the present embodiment, the lighting module 205, the first elastic element 220, the latch 240 and the second elastic element 250 are accommodated in a case 260, and the case 260 is disposed in the electronic apparatus 70 and attached to a housing 76 of the electronic apparatus 70. In other words, the lighting module 205 is suitable for being stored in the electronic apparatus 70. In the present embodiment, the case 260 and the housing 76 are, for example, individually formed.

Referring to FIGS. 2A and 2E, the lighting module 205 has a light source 210 and a stopper element 230 as shown in FIG. 2E. The light source 210 is, for example, a light-emitting diode (LED). However, in other embodiments, the light source may be other types of light sources. In the present embodiment, the lighting module 205 is capable of being rotated about a first axis A1 (shown in FIG. 2D). Additionally, in the present embodiment, the light source 210 is used for lighting the keyboard 72 of the electronic apparatus 70. However, in other embodiments, the light source 210 may be used for lighting the objects which a camera of the electronic apparatus 70 shoots or for other appropriate purposes.

The first elastic element 220 is connected to the lighting module 205. In the present embodiment, the first elastic element 220 is also in contact with the case 260. In addition, the first elastic element 220 is, for example, a torsion coil spring for exerting a torque on the lighting module 205. However, in other embodiments, the first elastic element 220 may be other types of springs or other appropriate elastic element.

Referring to FIGS. 2A and 2E, the latch 240 has an interfering portion 248 for blocking the stopper element 230 and is capable of sliding in the electronic apparatus 70, in which the interfering portion 248 is, for example, a protrusion. In the present embodiment, the latch 240 is capable of being slid along a second axis A2 substantially parallel to the first axis A1. The second elastic element 250 is connected to the latch 240. In the present embodiment, the second elastic element 250 is also connected to the case 260. Moreover, the second elastic element 250 is, for example, a compression coil spring. When the latch 240 is subjected to an external force and slides to deform the second elastic element 250, the stopper element 250 disengages from the interfering portion 248 and the first elastic element 220 rotates the lighting module 205 such that the lighting module 205 is at a different position, for example, protrudes from the electronic apparatus 70, and the light source 210 is used to illuminate part of the electronic device 70.

In the present embodiment, the stopper element 230 is, for example, a stair-shaped structure. In the present embodiment, the stopper element 230 has a first step 232 and a second step 234. Moreover, in the present embodiment, the stopper element 230 has a third inclined surface 236 inclined with respect to the second axis A2, and the latch 240 has a fourth inclined surface 246 inclined with respect to the second axis A2 and located at an end of the latch 240.

In the present embodiment, the lighting structure 210 further includes a knob 270 movably disposed at the electronic apparatus 70, and the external force applied on the latch 240 is generated by pushing the knob 270. In more detail, the knob 270 is capable of being moved along a third axis A3 substantially perpendicular to the first axis A1 and the second axis A2. Additionally, in the present embodiment, the lighting structure 200 further includes a third elastic element 280 connected to the knob 270 and the electronic apparatus 70 for restoring the knob 270 to an original position thereof after being pushed. In the present embodiment, the third elastic element 280 is, for example, a spring leaf.

In the present embodiment, the knob 270 has a second interfering portion 272 having a second inclined surface 274 inclined with respect to the second axis A2, and the latch 240 has a first interfering portion 242 having a first inclined surface 244 inclined with respect to the second axis A2. In more detail, the second interfering portion 272 is, for example, a protrusion, and the first interfering portion 242 is, for example, a recess. However, in other embodiments, the second interfering portion 272 and the first interfering portion 242 may be a recess and a protrusion, respectively.

Referring to FIGS. 2C and 2D, in the present embodiment, the lighting structure 200 further includes a switch 290 connected to the lighting module 205, and the light source 210 is turned on by the switch 290 coming in contact with the electronic apparatus 70 when the lighting module 205 is at a different position, for example, protrudes from the electronic apparatus 70. In more detail, the lighting structure 200 further includes a circuit board 292 electrically connecting the lighting module 205 and the switch 290. Additionally, the electronic apparatus 70 may have a fifth interfering portion 74 corresponding to the switch 290.

Figure 3A:
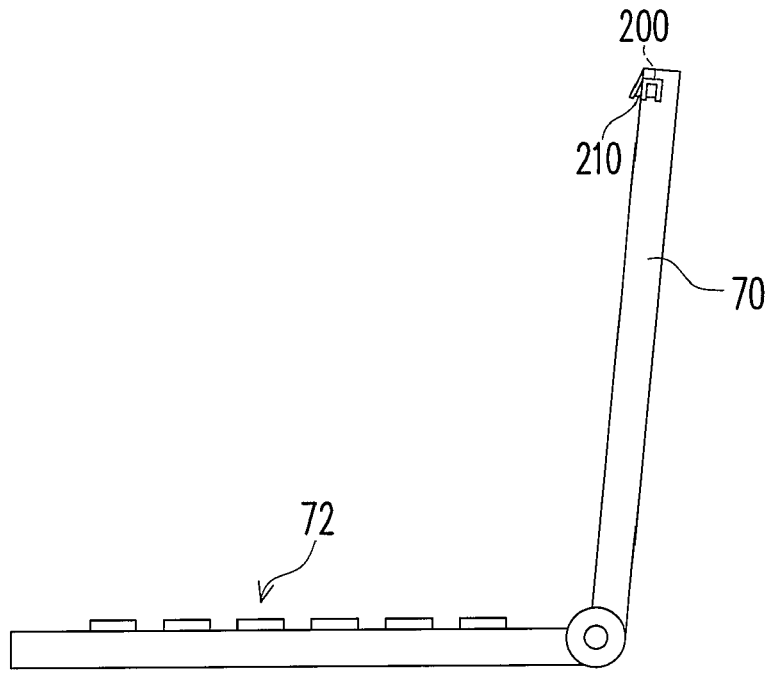
FIG. 3A is a schematic structural view of the lighting structure disposed at the electronic apparatus at a second state.
Figure 3B:
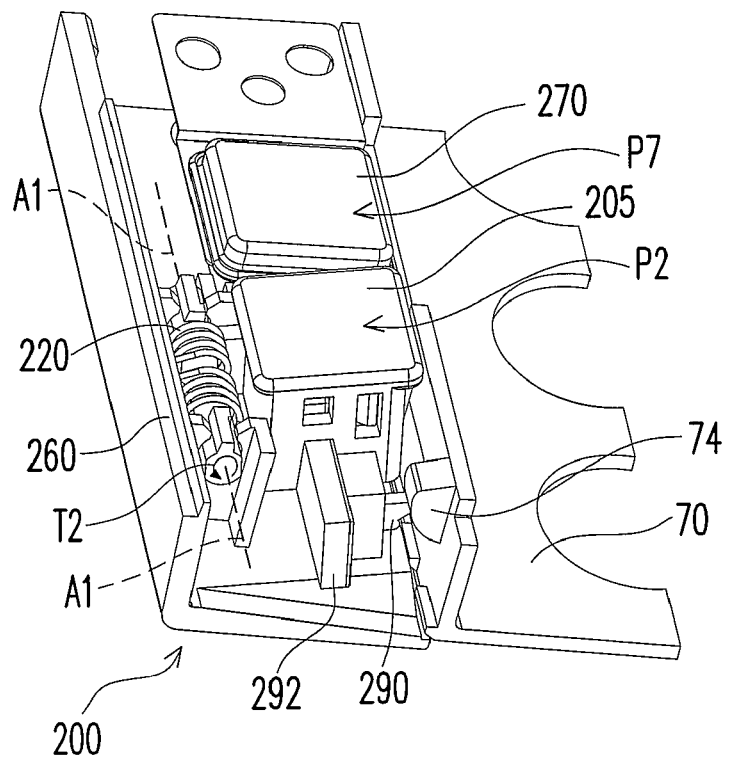
FIG. 3B is a schematic perspective view of the lighting structure at the second state.
Figure 4A:
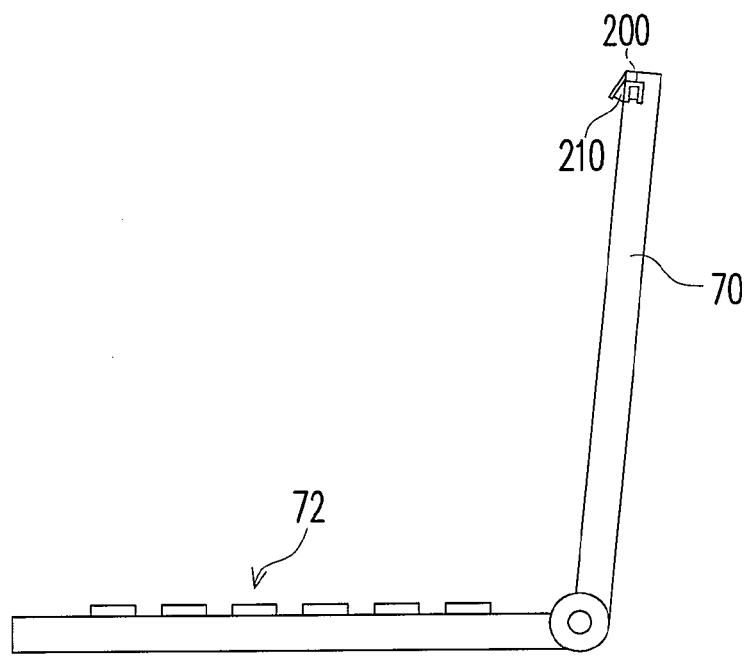
FIG. 4A is a schematic structural view of the lighting structure disposed at the electronic apparatus at a third state.
Figure 4B:
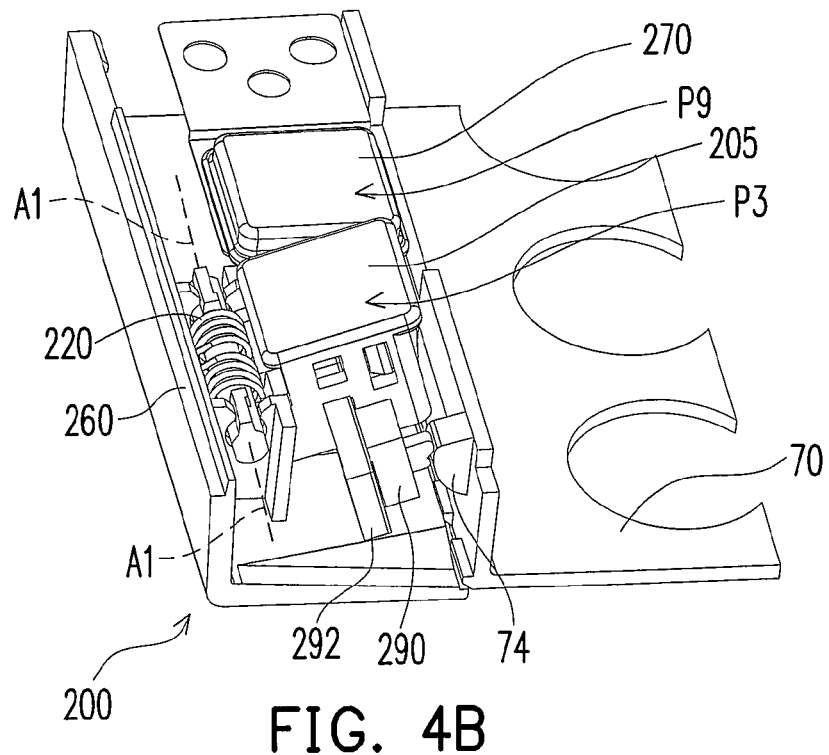
FIG. 4B is a schematic perspective view of the lighting structure at the third state.

In the present embodiment, the lighting module 205 is suitable for being put into multiple positions, for example, a first position P1 as shown in FIG. 2D, a second position P2 as shown in FIG. 3B, and a third position P3 as shown in FIG. 4B, such that the light source 210 illuminates different parts of the electronic apparatus 70. The operation process of the lighting structure 200 is described below. Referring to FIGS. 2A, 2D and 2E, when the lighting structure 200 is at the first state, that means the latch 240 is at a fourth position P4, the lighting module 205 is at the first position P1 and the knob 270 is at a seventh position P7, the first elastic element 220 is elastically deformed, and a first torque T1 is exerted on the lighting module 205 by the first elastic element 220. In the meantime, the latch 240 blocks the first step 232 of the stopper element 230, such that the lighting module 205 rests at the first position. Moreover, in the meantime, the fifth interfering portion 74 does not interfere with the switch 290, such that the light source 210 is at an off state; that is, the light source 210 does not emit light.

Figure 3C:
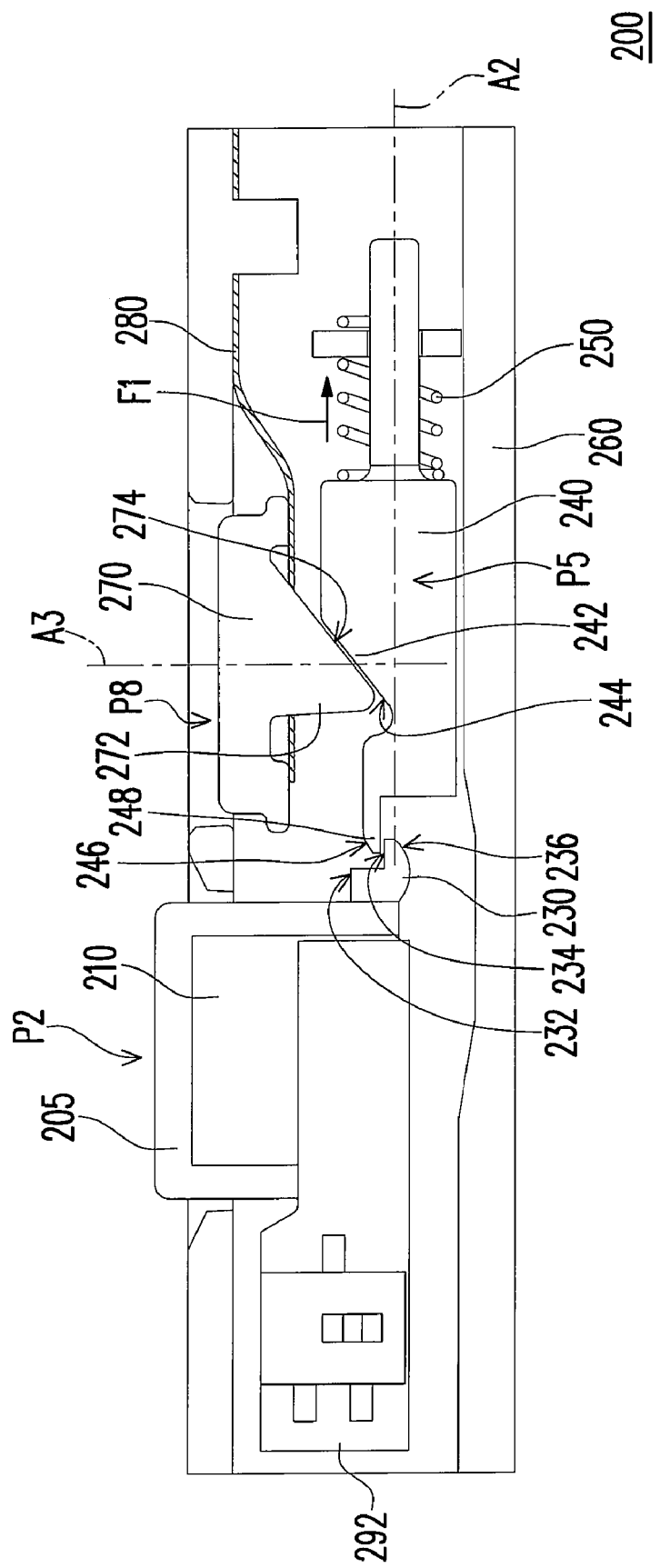
FIG. 3C is a schematic cross-sectional view of the lighting structure at the second state.

FIG. 3A is a schematic structural view of the lighting structure disposed at the electronic apparatus at a second state, FIG. 3B is a schematic perspective view of the lighting structure at the second state, and FIG. 3C is a schematic cross-sectional view of the lighting structure at the second state. Referring to FIGS. 3A through 3C, when the lighting structure 200 is at the second state, that means the latch 240 is at a fifth position P5, the lighting module 205 is at the second position P2 and the knob 270 is at an eighth position P8, a first force F1 is exerted on the latch 240 to elastically deform the second elastic element 250, the first elastic element 220 is elastically deformed, and a second torque T2 is exerted on the lighting module 205 by the first elastic element 220. In the mean time, the latch 240 blocks the second step 234 of the stopper element 230, such that the lighting module 205 rests at the second position. It should be noted that the direction of the first torque T1 (shown in FIG. 2D) is the same as that of the second toque T2 but the magnitude of the first torque T1 may be greater than that of the second torque T2.

In the present embodiment, a user may press the knob 270 to move the knob 270 from the seventh position P7 (shown in FIG. 2E) to the eighth position P8. In the meantime, the third elastic element 280 is elastically deformed, and the second inclined surface 274 contacts the first inclined surface 244, such that the knob 270 exerts the first force F1 on the latch 240 to push the latch 240 to the fifth position P5, and thus the latch 240 shifts position and blocks the second step 234 instead of the first step 232.

Additionally, in the present embodiment, the fifth interfering portion 74 interferes with the switch 290 to turn on the light source 210 when the lighting module 205 is at the second position P2. In more detail, the fifth interfering portion 74 such as a protrusion presses the switch 290 to turn on the light source 210 such that the light source 210 emits light.

Figure 4C:
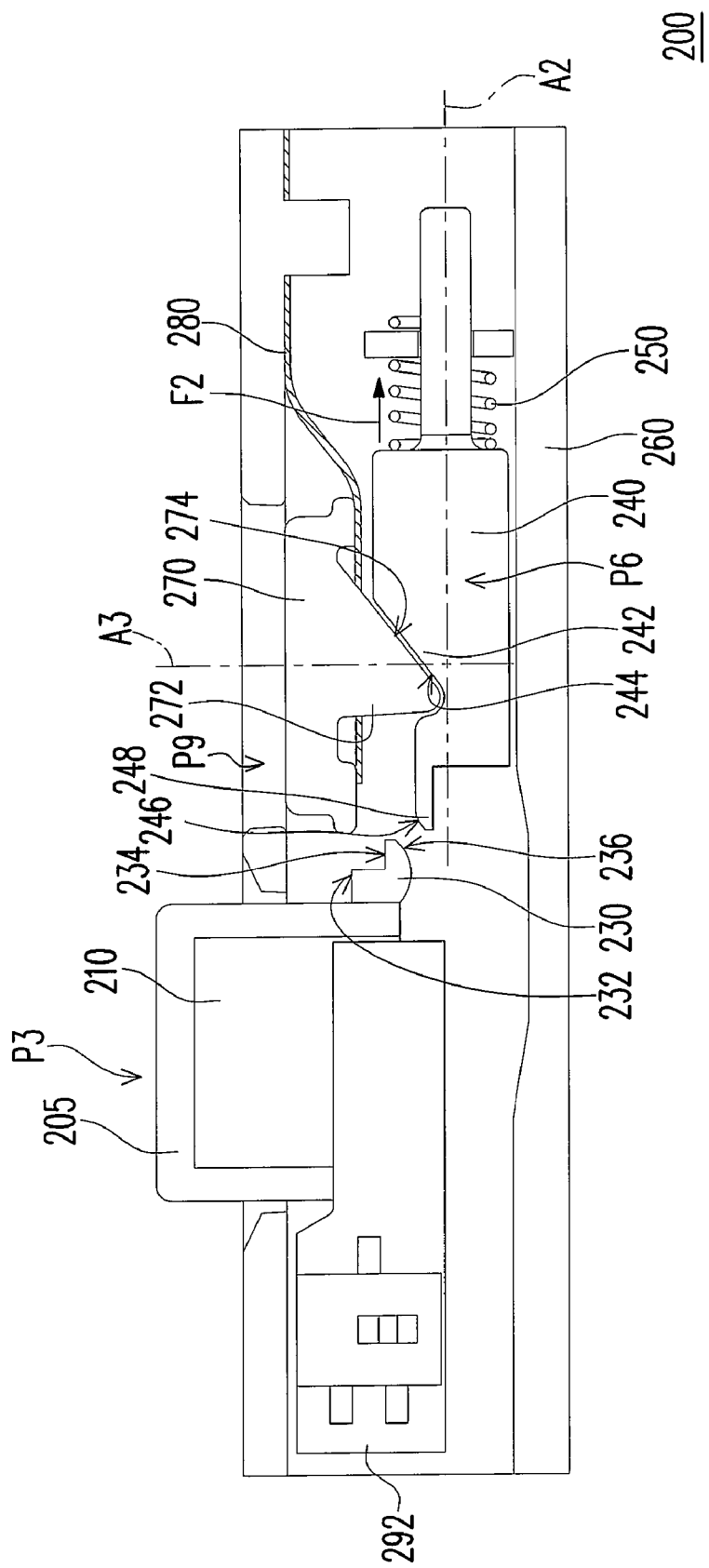
FIG. 4C is a schematic cross-sectional view of the lighting structure at the third state.

FIG. 4A is a schematic structural view of the lighting structure disposed at the electronic apparatus at a third state, FIG. 4B is a schematic perspective view of the lighting structure at the third state, and FIG. 4C is a schematic cross-sectional view of the lighting structure at the third state. Referring to FIGS. 4A through 4C, in the present embodiment, the multiple positions, for example, the first, second, and third position P1, P2, P3, include a maximum protrusion position, i.e. the third position P3, where the interfering portion 248 of the latch 240 is not in contact with the stopper element 230. The magnitude of protrusion of the lighting module 205 from the electronic apparatus 70 is at maximum when the lighting module 205 is at the maximum protrusion position, i.e. the third position P3. In more detail, when the lighting structure 200 is at the third state, that means the latch 240 is at a sixth position P6, the lighting module 205 is at the third position P3 and the knob 270 is at a ninth position P9, a second force F2 is exerted on the latch 240 to elastically deform the second elastic element 250, and the latch 240 does not block the stopper element 230. It should be noted that the direction of the first force F1 (shown in FIG. 3D) is the same as that of the second force F2 but the magnitude of the first force F1 may be smaller than that of the second force F2.

In the present embodiment, the user may press the knob 270 to move the knob 270 from the eighth position P8 (show in FIG. 3C) to the ninth position P9. In the meantime, the third elastic element 280 is elastically deformed, and the second inclined surface 274 contacts the first inclined surface 244, such that the knob 270 exerts the second force F2 on the latch 240 to push the latch 240 to the ninth position P9.

Additionally, in the present embodiment, the fifth interfering portion 74 interferes with the switch 290 to turn on the light source 210 when the lighting module 205 is at the third position P3. In more detail, the fifth interfering portion 74 such as a protrusion presses the switch 290 to turn on the light source 210.

After the knob 270 is pressed to the ninth position P9, the latch 240 is moved to the sixth position P6, and the lighting module 205 is rotated to the third position P3, the user may release the knob 270 whereby the latch 240 is rebounded by the restoring force of the second elastic element 250 in the direction opposite to the second force F2. However, at this time, the rebounded latch 240 does not block the first step 232 or the second step 234 such that the lighting module 205 may rest at the third position.

Referring to FIGS. 4C, 3C and 2E, when the user wants to close the lighting structure 200, the lighting module 205 may be pressed, so as to rotate the lighting module 205 from the third position P3 through the second position P2 to the first position P1 or from the second position P2 to the first position P1. In the present embodiment, when the lighting module 205 is rotated from the third position P3 to the second position P2, the third inclined surface 236 of the stopper element 230 contacts the fourth inclined surface 246 of the latch 240 such that the latch 240 is moved along the second axis A2. Therefore, the lighting module 205 may be rotated from the third position P3 to the second position P2 successfully.

In the lighting structure 200 of the present embodiment, since the stopper element 230 is disposed on the lighting module 205, and since the lighting module 205 and the latch 240 are individual elements, the lighting module 205 has a small volume and less weight. Therefore, the lighting structure 200 is easier to operate and has better appearance.

Since the lighting structure 200 has the stopper element 230 having two steps for being blocked by the latch 240, the lighting module 205 is capable of being rotated from the first position P1 through the second position P2 to the third position P3 and the light source 210 emits light at the second position P2 and the third position P3, thus comparing with the conventional lighting structure 100, the user can choose the range of illumination of the lighting module 205 at the second position P2 or that of the lighting module 205 at the third position P3. Accordingly, the application of the lighting structure 200 is improved. It should be noted that the number of steps of the stopper element 230 is not limited to two in the present invention. In other embodiments, a stopper element 230 may have three or more steps, such that the lighting module 205 may rest at four or more positions.

Figure 5:
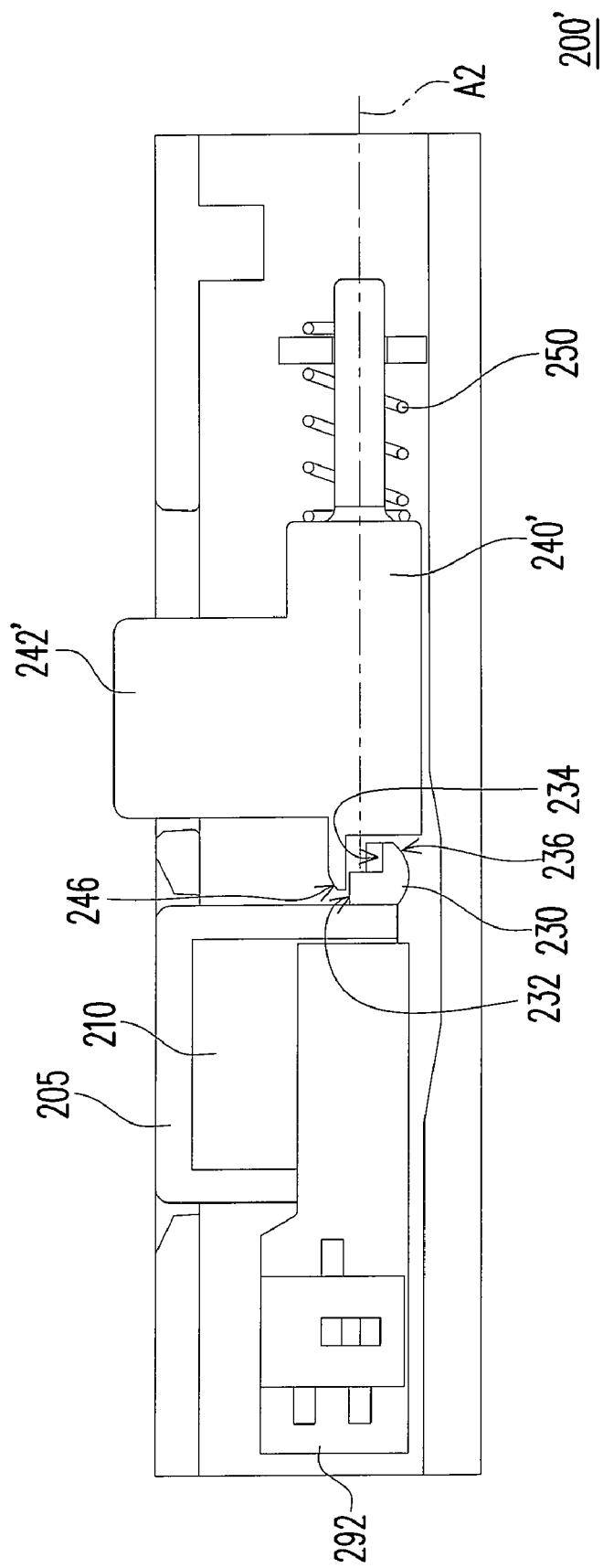
FIG. 5 is a schematic cross-sectional view of a lighting structure according to another embodiment of the present invention.

FIG. 5 is a schematic cross-sectional view of a lighting structure according to another embodiment of the present invention. Referring to FIG. 5, the lighting structure 200' of the present embodiment is similar to the above lighting structure 200 in FIG. 2E, and the differences therebetween are as follows. The lighting structure 200' does not have a knob like the knob 270 in FIG. 2E, but a latch 240' with an operation portion 242' instead. The user may push the operation portion 242' along the second axis A2 to move the latch 240' to control the positions of the lighting module 205.

Figure 6:
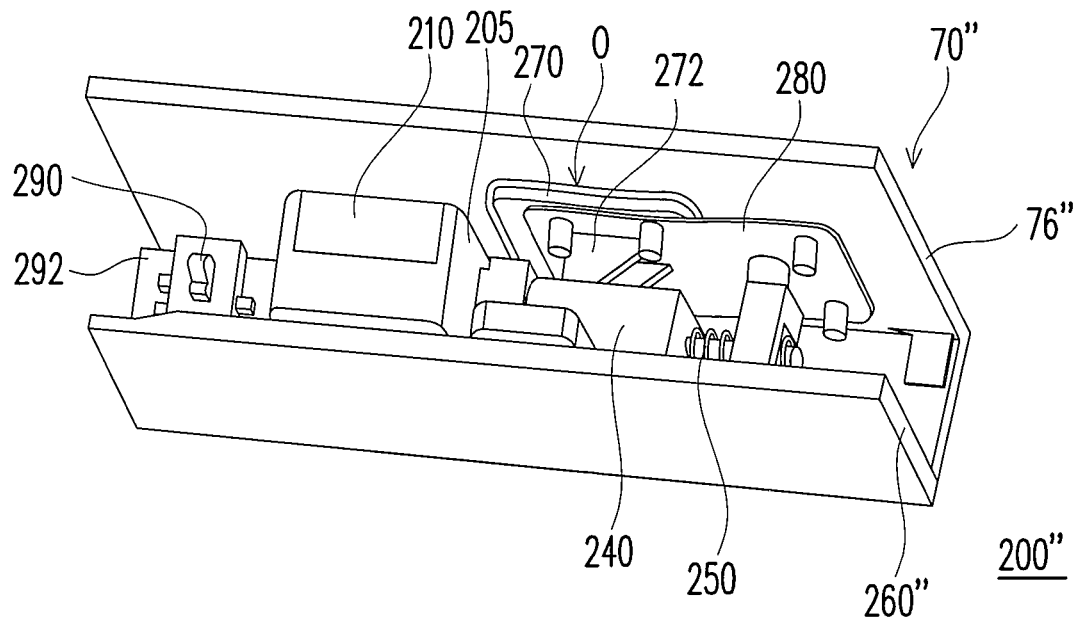
FIG. 6 is a schematic perspective view of a lighting structure according to another embodiment of the present invention.
Figure 7:
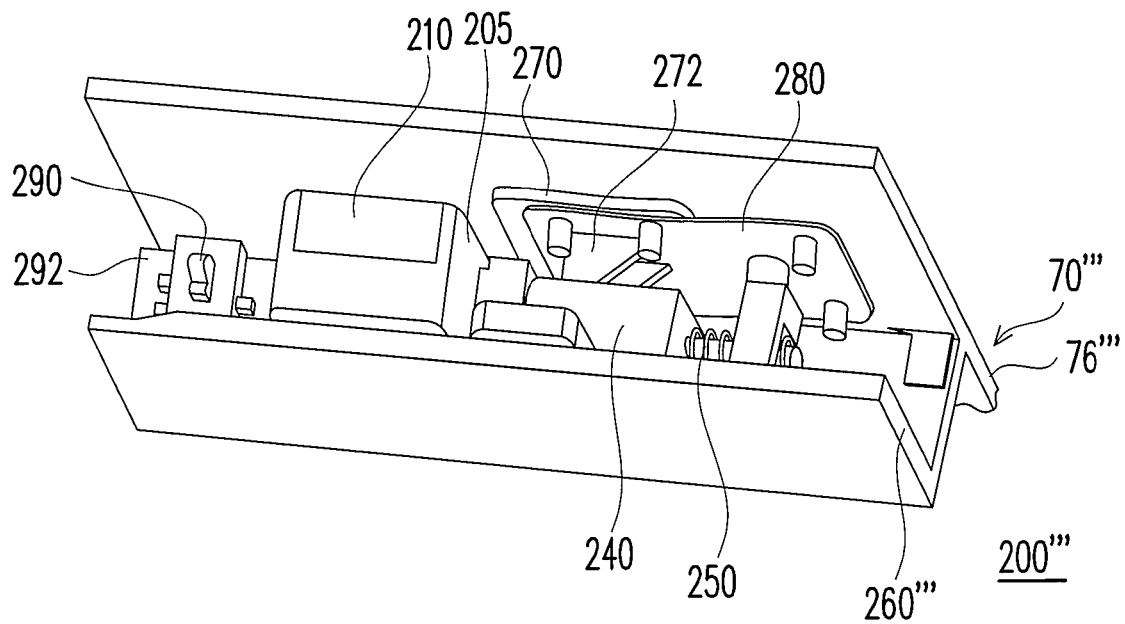
FIG. 7 is a schematic perspective view of a lighting structure according to another embodiment of the present invention.

Although the lighting structure 200 in the aforementioned embodiments shown in FIGS. 2C and 2D are attached to the electronic apparatus 70 as a module in which all components, for example, the lighting module 205, the first elastic element 220, the latch 240, the second elastic element 250, etc., are contained in a case 260, a lighting structure according to other embodiments of the present invention may be attached to an electronic apparatus in other modes. For example, referring to FIG. 6, a lighting structure 200" may have similar structure to that of the lighting structure 200, wherein the differences are that a case 260" of the lighting structure 200" is a base plate and the knob 270 is disposed in an opening O of a housing 76" of an electronic apparatus 70", and the case 260" and the housing 76" are individually formed. Referring to FIG. 7, according to another embodiment of the invention, a lighting structure 200''' may have similar structure to that of the aforementioned lighting structure 200, wherein the differences are that a case 260''' of the lighting structure 200''' and a housing 76''' of an electronic apparatus 70''' are integrally formed. In other words, all components, for example, the lighting module 205, the latch 240, the second elastic element 250, etc., are fixed directly to the housing 76''' of the electronic apparatus 70'''. That is, no base plate is needed for assembling the components thereon before disposing the components in the electronic apparatus. Rather, the components are fixed to the housing 76''' piece by piece to collectively form a lighting structure that performs functions of the invention.

In addition, while a lighting structure of the invention is accommodated in an electronic apparatus, the initial posture of the lighting module 205 is not limited to the fully submerged model as depicted in FIG. 2B. For example, the lighting module 205 may emerge upon opening of the electronic apparatus and submerge upon closing of the electronic apparatus, wherein the operations of emitting light and shifting positions are similar to the embodiments described above. The automatic emersion can be achieved with a simple addition of a latch that is integrated with the lighting module, or with simple modification to the lighting structure and is therefore not described in detail.

Moreover, in other embodiments, the light source 210 emits light at different intensities. The light intensity is controlled or adjusted by user to cater to each lighting need in different environments. The adjustable light intensities of the light source 210 can be achieved by conventional methods, for example, incorporating a signal line and a circuit into the lighting structure, the configuration of which is well known in the art and thus is not described herein.

To sum up, in the lighting structure according to the embodiments of the present invention, since the stopper element is disposed on the lighting module, and since the lighting module and the latch are individual elements, the lighting module has a small volume and less weight. Therefore, the lighting structure according to the embodiments of the present invention is easier to operate and has better appearance.

Since the lighting structure according to the embodiments of the present invention has the stopper element having two or more steps for being blocked by the latch and has different light intensity levels, the lighting module is capable of being rotated to and resting at three or more positions and the lighting module emits light at two or more positions as well as at least one light intensity level, thus the user can choose the range of illumination and the level of light intensity of the lighting module at one of the positions or that of the lighting module at another one of the positions. Accordingly, the application of the lighting structure is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lighting structure adapted to be disposed at an electronic apparatus, comprising:
    a lighting module having a light source and a stopper element, wherein the stopper element is a stair-shaped structure and comprises a first step and a second step;
    a first elastic element connected to the lighting module;
    a latch having a first interfering portion for blocking the stopper element and capable of sliding in the electronic apparatus, wherein the first interfering portion is adapted to selectively block the first step or the second step; and
    a second elastic element connected to the latch,
    wherein when the latch is subjected to an external force and slides to deform the second elastic element, the stopper element disengages from the first interfering portion and the first elastic element rotates the lighting module such that the lighting module is at a different position, and the light source is used to illuminate part of the electronic apparatus.

2. The light structure according to claim 1, wherein the lighting module is suitable for being stored in the electronic apparatus.

3. The lighting structure according to claim 1, wherein the lighting module is suitable for being put into multiple positions such that the light source illuminates different parts of the electronic apparatus.

4. The lighting structure according to claim 3, wherein the multiple positions include a maximum protrusion position where the first interfering portion is not in contact with the stopper element.

5. The lighting structure according to claim 1, wherein the lighting module protrudes from the electronic apparatus when being rotated by the first elastic element.

6. The lighting structure according to claim 1, wherein the lighting module is capable of being rotated about a first axis.

7. The lighting structure according to claim 6, wherein the latch is capable of being slid along a second axis substantially parallel to the first axis.

8. The lighting structure according to claim 7, further comprising a knob movably disposed at the electronic apparatus, wherein the knob is capable of being moved along a third axis substantially perpendicular to the first axis and the second axis.

9. The lighting structure according to claim 8, wherein the latch further has a second interfering portion having a first inclined surface inclined with respect to the second axis, the knob has a third interfering portion having a second inclined surface inclined with respect to the second axis, one of the second interfering portion and the third interfering portion is a recess, the other one of the second interfering portion and the third interfering portion is a protrusion, the protrusion is capable of being moved into the recess, and when the knob is moved along the third axis, the second inclined surface is slid along the first inclined surface, so that the latch is slid along the second axis.

10. The lighting structure according to claim 1, further comprising a knob movably disposed at the electronic apparatus, wherein the external force applied on the latch is generated by pushing the knob.

11. The lighting structure according to claim 10, further comprising a third elastic element connected to the knob and the electronic apparatus for restoring the knob to an original position thereof after being pushed.

12. The lighting structure according to claim 11, wherein the third elastic element is a spring leaf.

13. The lighting structure according to claim 1, wherein the first elastic element is a torsion coil spring.

14. The lighting structure according to claim 1, wherein the second elastic element is a compression coil spring.

15. The lighting structure according to claim 1, further comprising a switch connected to the lighting module, wherein the light source is turned on by the switch coming in contact with the electronic apparatus when the lighting module is rotated by the first elastic element.

16. The lighting structure according to claim 15, further comprising a circuit board electrically connecting the lighting module and the switch.

17. The lighting structure according to claim 1, further comprising a case for accommodating the lighting module, the first elastic element, the latch, and the second elastic element.

18. The lighting structure according to claim 17, wherein the case and a housing of the electronic apparatus are integrally formed.

19. The lighting structure according to claim 17, wherein the case is disposed in the electronic apparatus and attached to a housing of the electronic apparatus.

20. The lighting structure according to claim 1, wherein the light intensity of the light source is adjustable.

* * * * *